United States Patent
Cho et al.

(10) Patent No.: US 10,404,828 B2
(45) Date of Patent: Sep. 3, 2019

(54) STREAMING APPARATUS, STREAMING METHOD, AND STREAMING SERVICE SYSTEM USING THE STREAMING APPARATUS

(71) Applicant: NAVER Corporation, Seongnam-si, Gyeonggi-do (KR)

(72) Inventors: Sung Tak Cho, Seongnam-si (KR); Sung Ho Kim, Seongnam-si (KR); Joon Kee Chang, Seongnam-si (KR); Min Hee Choi, Seongnam-si (KR); Ki Su Park, Seongnam-si (KR); Kyoung Yun Kang, Seongnam-si (KR); Young Min Kim, Seongnam-si (KR); Dong Ock Kim, Seongnam-si (KR); Eun Sun Shin, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 121 days.

(21) Appl. No.: 15/408,694

(22) Filed: Jan. 18, 2017

(65) Prior Publication Data

US 2017/0214765 A1     Jul. 27, 2017

(30) Foreign Application Priority Data

Jan. 22, 2016 (KR) ........................ 10-2016-0008248

(51) Int. Cl.
 *H04L 29/08* (2006.01)
 *H04L 29/06* (2006.01)

(52) U.S. Cl.
 CPC .......... *H04L 67/325* (2013.01); *H04L 65/605* (2013.01); *H04L 65/607* (2013.01);
 (Continued)

(58) Field of Classification Search
 CPC .............. H04L 67/325; H04L 65/4076; H04L 65/4084; H04L 65/607; H04L 65/608;
 (Continued)

(56) References Cited

U.S. PATENT DOCUMENTS

| | | |
|---|---|---|
| 2004/0148399 A1 | 7/2004 | Fenizia et al. |
| 2012/0110138 A1 | 5/2012 | Zhang |

(Continued)

FOREIGN PATENT DOCUMENTS

| | | |
|---|---|---|
| CN | 102651756 A | 8/2012 |
| JP | 2012-514276 A | 6/2012 |

(Continued)

OTHER PUBLICATIONS

Office Action for Korean Application No. 10-2016-0008248 dated Dec. 19, 2016.

(Continued)

*Primary Examiner* — William G Trost, IV
*Assistant Examiner* — Tan Doan
(74) *Attorney, Agent, or Firm* — Harness, Dickey & Pierce, P.L.C.

(57) ABSTRACT

Provided are a streaming apparatus, a streaming method, and a streaming service system using the streaming apparatus, wherein the streaming apparatus includes: a scheduler configured to generate a modified metafile by modifying a reproduction list file of a metafile; and a server socket configured to transmit the modified metafile when a metafile transmit request is received from a player by operating as a server with respect to the player. Accordingly, delay times of players are substantially the same.

20 Claims, 10 Drawing Sheets

(52) U.S. Cl.
CPC .......... *H04L 67/02* (2013.01); *H04L 67/2842* (2013.01); *H04L 67/42* (2013.01); *H04L 65/4076* (2013.01); *H04L 65/4084* (2013.01); *H04L 65/608* (2013.01)

(58) Field of Classification Search
CPC ..... H04L 67/02; H04L 67/2842; H04L 67/42; H04L 65/602; H04L 65/605; H04L 47/20
USPC .......................................................... 709/231
See application file for complete search history.

(56) References Cited

U.S. PATENT DOCUMENTS

| | | | | |
|---|---|---|---|---|
| 2013/0173819 | A1* | 7/2013 | Lee | H04N 21/23418 709/231 |
| 2014/0156800 | A1* | 6/2014 | Falvo | H04N 21/8456 709/219 |
| 2014/0282792 | A1* | 9/2014 | Bao | H04N 21/44004 725/116 |
| 2015/0019676 | A1* | 1/2015 | Fablet | H04L 67/26 709/213 |
| 2015/0172348 | A1* | 6/2015 | Lohmar | H04L 65/607 709/219 |
| 2015/0304692 | A1* | 10/2015 | Gavade | H04N 21/2387 725/44 |

FOREIGN PATENT DOCUMENTS

| | | |
|---|---|---|
| JP | 2015-023416 A | 2/2015 |
| KR | 10-0899666 B1 | 5/2009 |
| KR | 2011-0059429 A | 6/2011 |
| KR | 10-1247133 B1 | 4/2013 |
| KR | 10-1397183 B1 | 5/2014 |
| KR | 10-1452345 B1 | 10/2014 |
| KR | 10-2015-0120882 | 10/2015 |
| WO | WO-2010/078281 A2 | 7/2010 |
| WO | WO-2015/001947 A1 | 1/2015 |

OTHER PUBLICATIONS

Chinese Office Action dated Jun. 14, 2019 for CN Application No. 201710036150.1.

* cited by examiner

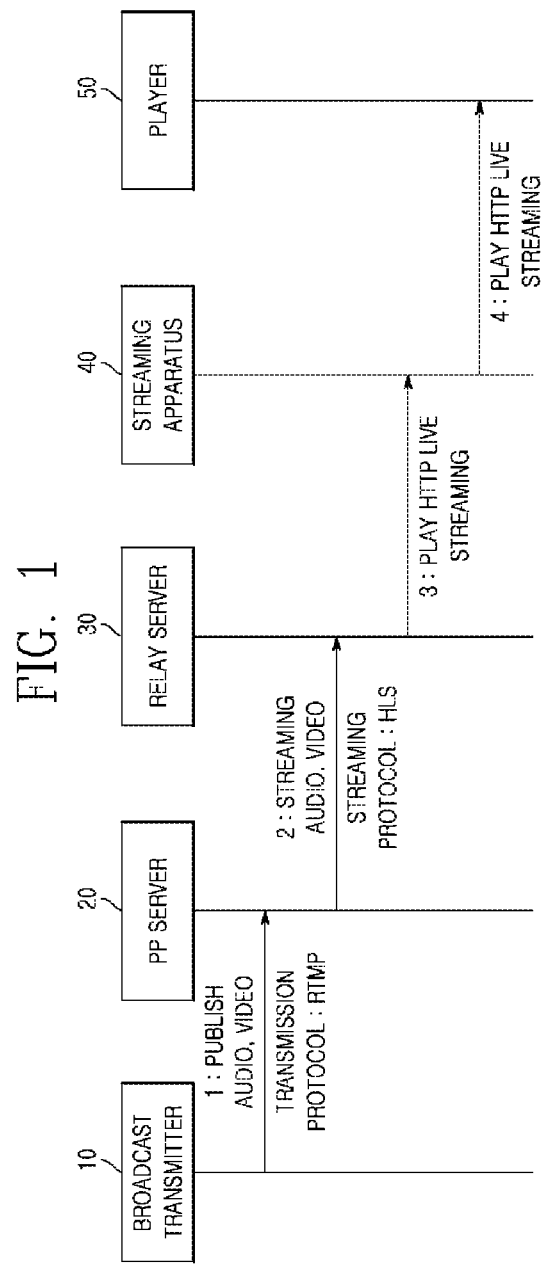

FIG. 2

```
#EXTM3U
#EXT-X-VERSION:3
#EXT-X-ALLOW-CACHE:NO
#EXT-X-TARGETDURATION:11
#EXT-X-MEDIA-SEQUENCE:108516
#EXTINF:5.005,
media-urnscsvg4_108516.ts
#EXTINF:5.005,
media-urnscsvg4_108517.ts
#EXTINF:5.005,
media-urnscsvg4_108518.ts
#EXTINF:5.005,
media-urnscsvg4_108519.ts
#EXTINF:5.005,
media-urnscsvg4_108520.ts
#EXTINF:5.005,
media-urnscsvg4_108521.ts
```

FIG. 3A

```
#EXTM3U
#EXT-X-VERSION:3
#EXT-X-ALLOW-CACHE:NO
#EXT-X-TARGETDURATION:11
#EXT-X-MEDIA-SEQUENCE:108516
#EXTINF:5.005,
media-urnscsvg4_108516.ts
#EXTINF:5.005,
media-urnscsvg4_108517.ts
#EXTINF:5.005,
media-urnscsvg4_108518.ts
#EXTINF:5.005,
media-urnscsvg4_108519.ts
#EXTINF:5.005,
media-urnscsvg4_108520.ts
#EXTINF:5.005,
media-urnscsvg4_108521.ts
```

FIG. 3B

```
#EXTM3U
#EXT-X-VERSION:3
#EXT-X-ALLOW-CACHE:NO
#EXT-X-TARGETDURATION:11
#EXT-X-MEDIA-SEQUENCE:108520
#EXTINF:5.005,
media-urnscsvg4_108520.ts
#EXTINF:5.005,
media-urnscsvg4_108521.ts
```

FIG. 4A

```
#EXTM3U
#EXT-X-VERSION:3
#EXT-X-ALLOW-CACHE:NO
#EXT-X-TARGETDURATION:11
#EXT-X-MEDIA-SEQUENCE:108516
#EXTINF:5.005,
media-urnscsvg4_108516.ts
#EXTINF:5.005,
media-urnscsvg4_108517.ts
#EXTINF:5.005,
media-urnscsvg4_108518.ts
#EXTINF:5.005,
media-urnscsvg4_108519.ts
#EXTINF:5.005,
media-urnscsvg4_108520.ts
#EXTINF:5.005,
media-urnscsvg4_108521.ts
```

FIG. 4B

```
#EXTM3U
#EXT-X-VERSION:3
#EXT-X-ALLOW-CACHE:NO
#EXT-X-TARGETDURATION:11
#EXT-X-MEDIA-SEQUENCE:108516
#EXTINF:5.005,
media-urnscsvg4_108516.ts
#EXTINF:5.005,
media-urnscsvg4_108517.ts
#EXTINF:5.005,
media-urnscsvg4_108518.ts
#EXTINF:5.005,
```

FIG. 5A
CONVENTIONAL ART
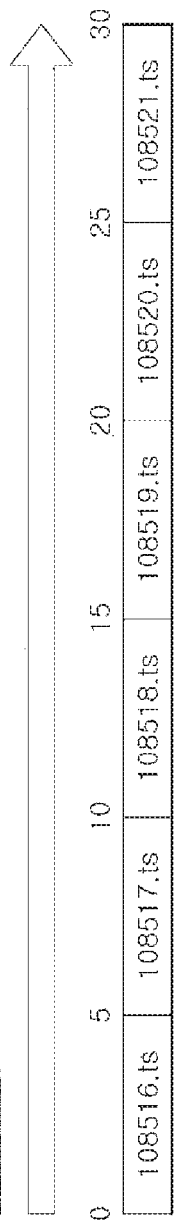
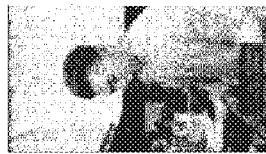

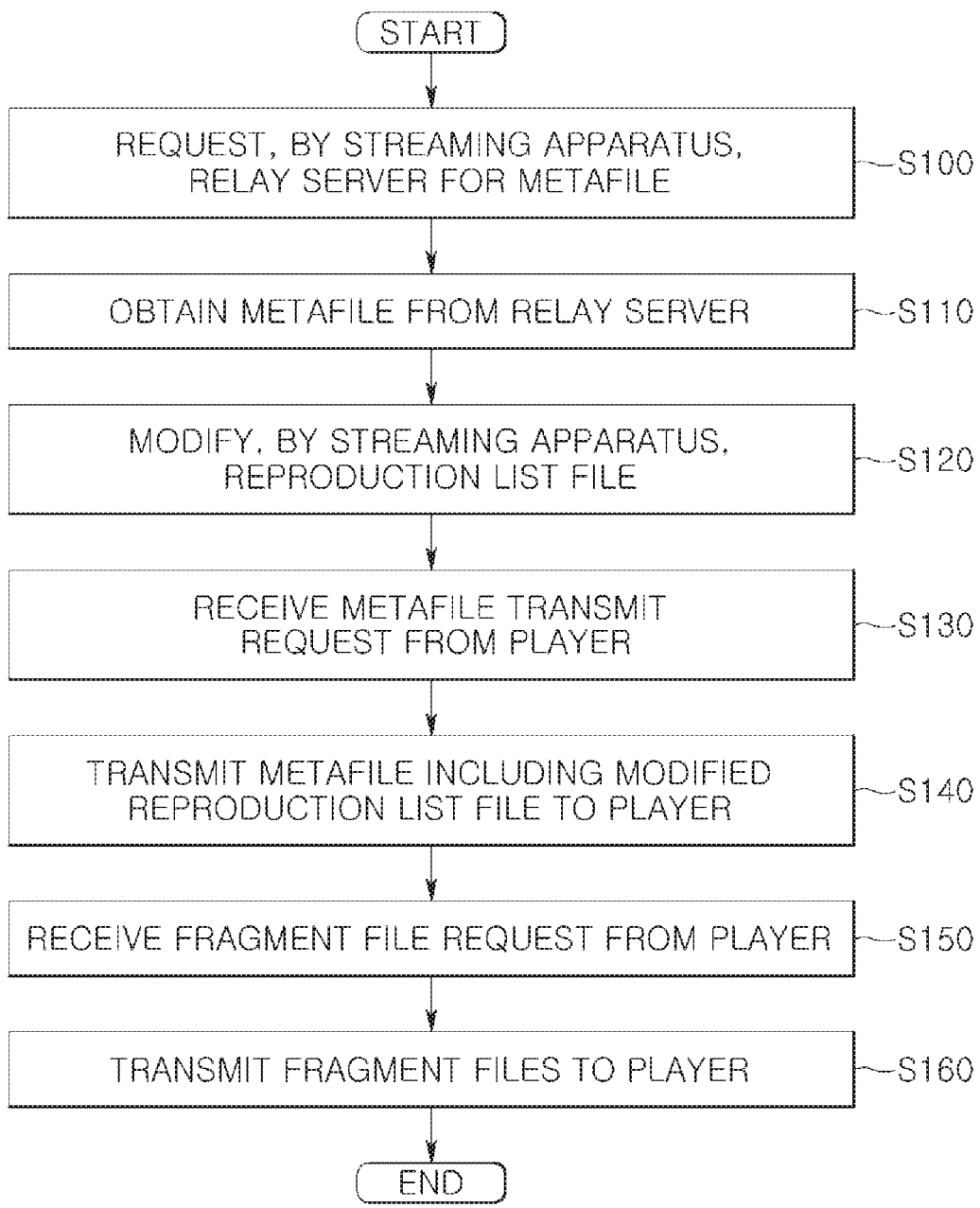

STREAMING APPARATUS, STREAMING METHOD, AND STREAMING SERVICE SYSTEM USING THE STREAMING APPARATUS

RELATED APPLICATION

This application claims the benefit of Korean Patent Application No. 10-2016-0008248, filed on 22 Jan. 2016, in the Korean Intellectual Property Office, the disclosure of which is incorporated herein in its entirety by reference.

BACKGROUND

1. Field

Example embodiments relate to a streaming apparatus, a streaming method, and/or a streaming service system using the streaming apparatus. For example, at least some example embodiments relate to a streaming apparatus, a streaming method, and/or a streaming service system using the streaming apparatus, whereby delay times of players of a plurality of terminal apparatuses are substantially the same and/or buffering of the players is reduced by modifying a reproduction list file.

2. Description of the Related Art

A streaming service may reproduce multimedia data in real-time through, for example, the Internet.

Recently, the streaming service is provided by using a standard hyper text transfer protocol (HTTP) instead of a traditional server-driven protocol, such as a real time messaging protocol (RTMP) or a real time streaming protocol (RTSP).

As a method of providing the streaming service by using the standard HTTP, a HTTP progressive download method and a HT IP live streaming (HLS) method may be used.

According to the HLS method, a media file is fragmented, for example, into files (for example, MPEG-2 transport stream files) having a short length of about 10 seconds (generally, 5 to 15 seconds), and a reproduction list file, i.e., meta information of file fragments is provided to a client. The reproduction list file may be an M3U8 (HLS2) file using a synchronized multimedia integration language (SMIL) that is a type of an extensible markup language (XML). Accordingly, a filename may include ".M3U8" or ".M3U". Here, a ".M3U" file may be used for content including only audio.

File fragments, i.e., image fragment files, may be in an MPEG2-TS format, and a filename extension is "ts".

Since filenames may indicate a sequential order, a file name may be generated such that a file name that will be assigned next may be inferred. A file name mainly uses a number in a decimal number format, but may alternatively use another notation. The reproduction list file may provide, as an extension function, tags for setting a reproduction order of image fragment files and various reproduction-related functions.

The client may download, from a server, the reproduction list file by using HTTP, and sequentially reproduce image fragment files assigned in the reproduction list file by downloading the image fragment files from the server.

In an HLS service, generally, the reproduction list file transmitted to a client includes a reproduction order of 3 or more image fragment files. If reproduction starts after a third image fragment file that is the last image fragment file in a file list of a reproduction list file, the client may request for a new reproduction list file. In addition, if the client found an updated reproduction list after receiving the reproduction list file from the server, the client requests for files corresponding to the updated reproduction list after standing by at least for a length of the last image fragment file of the reproduction list. If the reproduction list is not updated, the client may request again for the new reproduction list file after standing by, for example, for 0.5 times of a target length.

As such, the HLS method supports both live streaming and video on demand (VOD) streaming, wherein in case of the live streaming, a protocol operates in quasi real time, and a reproduction start time of a player may vary according to transport streams (TS) included in M3U8 and thus a delay time of the player may vary.

SUMMARY

One or more example embodiments include a streaming apparatus, a streaming method, and/or a streaming service system using the streaming apparatus, whereby delay times are substantially the same and/or buffering is reduced in a plurality of players by modifying a reproduction list in a hyper text transfer protocol (HTTP) live streaming (HLS) method.

Additional aspects will be set forth in part in the description which follows and, in part, will be apparent from the description, or may be learned by practice of the presented example embodiments.

One or more example embodiments relate to a streaming apparatus.

In some example embodiments, the streaming apparatus includes a scheduler configured to generate a modified metafile by modifying a reproduction list file included in a metafile; and a server socket configured to transmit the modified metafile, if the streaming apparatus receives a metafile transmit request from a player such that the streaming apparatus is configured to operate as a server with respect to the player.

In some example embodiments, the scheduler is configured to modify the reproduction list file by modifying a serial number of a file to reproduce first in the reproduction list file to generate a modified serial number, and generate the modified metafile including a file name after the modified serial number.

In some example embodiments, the scheduler is configured to modify the reproduction list file by, obtaining a serial number of a last fragment file name of the reproduction list file of the metafile to assign, as a serial number of a file to reproduce first, generating an assigned serial number by subtracting N from the serial number of the last fragment file name, N being a natural number, and generating the modified metafile including a file name after the assigned serial number.

In some example embodiments, N is 0 or 1.

In some example embodiments, the scheduler includes a file parser configured to extract a serial number of a last fragment file name from the metafile received from a relay server; a reproduction list file modifier configured to assign an assigned serial number of a file to reproduce first by subtracting a certain number from the serial number of the last fragment file name; and a reproduction list file generator configured to generate the modified metafile including a certain number of fragment file names having the assigned serial number and serial numbers sequentially increasing from the assigned serial number.

In some example embodiments, the scheduler further includes a file cache unit configured to temporarily store a fragment file corresponding to a fragment file name of the metafile, and to transmit the temporarily stored fragment file according to a request of the player.

In some example embodiments, a client socket unit configured to receive the metafile from a relay server, and to transmit the metafile to the scheduler.

In some example embodiments, the client socket unit operates as a hyper text transfer protocol (HTTP) client, the HTTP client including a plurality of client sockets configured to receive the metafile from the relay server.

In some example embodiments, the scheduler is configured to modify the reproduction list file by, determining a serial number of a file to be reproduced first by subtracting N from a serial number of a last fragment file name of a reproduction list file, wherein N is a natural number between 2 and 5, and generating the modified metafile such that the modified metafile includes 3 to 6 fragment file name after the assigned serial number.

Some example embodiments relate to a streaming method performed by a streaming apparatus.

In some example embodiments, the streaming method includes generating a modified metallic by modifying a metafile; and transmitting the modified metafile, if the streaming apparatus receives a metafile transmit request from a player such that the streaming apparatus is configured to operate as a server with respect to the player.

In some example embodiments, the streaming method further includes transmitting a fragment file, if the streaming apparatus receives a fragment file transmit request from the player after transmitting the modified metafile to the player.

In some example embodiments, the streaming method further includes receiving the metafile from a relay server, wherein the generating generates the modified metafile by modifying the metallic received from the relay server.

In some example embodiments, the receiving the metafile includes requesting the metafile from the relay server via a plurality of client sockets operating as a hyper text transfer protocol (HTTP) clients; and receiving the metafile from the relay server such that the metafile includes a reproduction list file.

In some example embodiments, the generating the modified metafile includes extracting a serial number of a last fragment file name from the metafile; assigning an assigned a serial number of a file to reproduce first by subtracting a number from the serial number of the last fragment file name; and generating the modified metafile including a number of fragment file names having the assigned serial number and serial numbers sequentially increasing from the assigned serial number.

In some example embodiments, the assigning includes determining the assigned serial number of the file to reproduce first by subtracting N from the serial number of the last fragment file name, wherein N is 0 or 1.

In some example embodiments, the assigning includes determining the assigned serial number of the file to be reproduced first by subtracting N from the serial number of the last fragment file name, N being a natural number between 2 and 5; and generating the modified metafile such that the modified metafile includes 3 to 6 fragment file names after the assigned serial number.

Some example embodiments relate to a streaming service system.

In some example embodiments, the system includes a publish point server configured to segment multimedia data received in real-time into a plurality of fragment files, and to generate a metafile associated with the multimedia data; a relay server configured to relay the metafile; and a streaming apparatus configured to, modify a reproduction list file included in the metafile, and provide, to a player, the modified metafile such that the streaming apparatus is configured to operate as a server with respect to the player.

In some example embodiments, the system further includes a terminal apparatus, the terminal apparatus including the streaming apparatus.

In some example embodiments, the terminal apparatus is a smart phone, and the player is configured to execute an application to configure the streaming apparatus included in the terminal apparatus.

Some example embodiments relate to a non-transitory computer-readable recording medium.

In some example embodiments, the non-transitory computer-readable recording medium stores computer-executable instructions that, when executed by one or more processors included in a streaming apparatus, causes the one or more processors to perform operations including: modifying a reproduction list file included in metafile received from a relay server to generate a modified reproduction list file, the reproduction list file including at least file names associated with fragmented multimedia data, the filenames including an indication of an execution order of the fragmented multimedia data; storing, in a cache device, the fragmented multimedia data; and streaming requested fragments of the fragmented multimedia data based on the modified reproduction list file.

In some example embodiments, the computer-executable instructions, when executed, cause the one or more processors to generate the modified reproduction list file by reducing a number of the files names in the reproduction list file such that a delay time associated with different terminal apparatuses playing the modified reproduction list file is same.

BRIEF DESCRIPTION OF THE DRAWINGS

The above and other objects, features and other advantages of the example embodiments will be more clearly understood from the following detailed description taken in conjunction with the accompanying drawings, in which:

FIG. 1 is a diagram of a streaming service system using a streaming apparatus, according to an example embodiment;

FIG. 2 illustrates a general metafile in a live streaming service using a hypertext transfer protocol (HTTP) live streaming (HLS) protocol;

FIGS. 3A and 3B illustrate a metafile in which a reproduction list file is modified, according to an example embodiment;

FIGS. 4A and 4B illustrate a metafile in which a reproduction list file is modified, according to another example embodiment;

FIGS. 5A and 5B respectively illustrate a file reproduction order according to a general technology and a file reproduction order according to an example embodiment;

FIG. 9 is a flowchart of a streaming method according to an example embodiment.

DETAILED DESCRIPTION

Figure 5B:
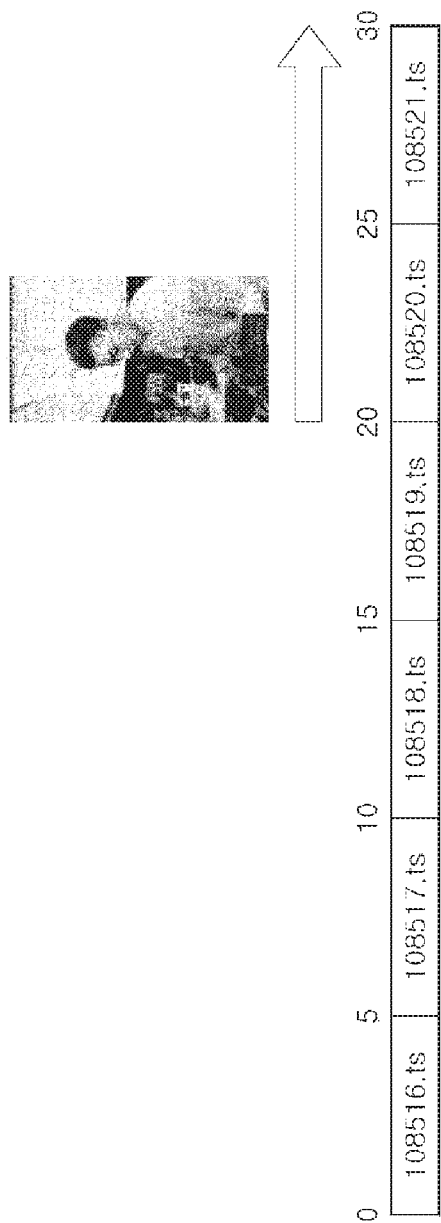

Example embodiments may allow for various changes and numerous example embodiments, therefore, non-limiting example embodiments will be illustrated in the drawings and described in detail in the written description.

In the description, certain detailed explanations of related art are omitted when it is deemed that they may unnecessarily obscure the essence of the example embodiments.

While such terms as "first", "second", etc., may be used to describe various components, such components must not be limited to the above terms. The above terms are used only to distinguish one component from another.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a Function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including tangible or non-transitory computer-readable storage media discussed herein.

According to one or more example embodiments, the processing circuitry may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing device into these various functional units.

For example, while the streaming apparatus described herein may be described as including a server socket unit, client socket unit, and/or scheduler including a file parser, reproduction list file modifier, and/or reproduction list file generator, the computer processing device (e.g., one or more processors) may be programmed with instructions that configure the computer processing device as a special purpose computer to perform the functions of these elements.

Units and/or devices according to one or more example embodiments may also include one or more storage devices. The one or more storage devices may be tangible and/or non-transitory computer-readable storage media, such as random access memory (RAM), read only memory (ROM), a permanent mass storage device (such as a disk drive, solid state (e.g., flash) device, and/or any other like data storage mechanism capable of storing and recording data. The one or more storage devices may be configured to store computer programs, program code, instructions, or some combination thereof, for one or more operating systems and/or for implementing one or more example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media.

The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of one or more example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be embodied as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a diagram of a streaming service system using a streaming apparatus, according to an example embodiment.

Referring to FIG. 1, a streaming service system according to an example embodiment may include a broadcast transmitter 10, a publish point (PP) server 20, a relay server 30, a streaming apparatus 40, and a player 50.

The broadcast transmitter 10 transmits, to the PP server 20, a video signal or a multimedia signal, such as a video signal and/or an audio signal. Here, the video signal and the multimedia signal, such as the video signal and/or the audio signal, provided by the broadcast transmitter 10 may be a live signal.

The broadcast transmitter 10 may include an image obtaining apparatus generally used to obtain an image, such as a camcorder or a camera.

Also, the broadcast transmitter 10 may include an encoder that digitally compresses the video signal or the multimedia signal, such as the video signal and/or the audio signal, obtained by the image obtaining apparatus.

The broadcast transmitter 10 may obtain an image signal through the image obtaining apparatus, encode and convert the obtained image signal into a multimedia stream using the encoder, and transmit the multimedia stream to the PP server 20.

Here, the multimedia stream may be transmitted to the PP server 20 by using a real-time streaming protocol (RTSP, regulated by RFC 2326) and a real-time transport protocol (RTP) or a real-time messaging protocol (RTMP), which are standard image transport protocols.

The PP server 20 may encode the video signal, or the video signal and the audio signal transmitted by the broadcast transmitter 10.

Then, the PP server 20 may include a stream segmenter configured to segment the multimedia stream into fragment files (chunks), and stream the fragment files to the relay server 30 by using a hyper text transfer protocol (HTTP) live streaming (HLS) protocol. Here, image fragment files generated by fragmenting video data may be referred to as a transport stream (TS) files.

The stream segmenter included in the PP server 20 may segment a video signal, or a video signal and an audio signal received at regular time intervals to generate segmented files, and generate a metafile including a reproduction list file accessible to the segmented files.

The metafile generated by the stream segmenter may have a M3U8 format.

The M3U8 format is extended from a W3U format, and compared to the M3U format, may use a EUC-KR character set and provide additional information about a file to be reproduced in various directives.

The first line of the M3U8 format may start with a '#EXTM3U' string.

Meanwhile, the relay server 30 transmits, to the streaming apparatus 40, streaming data converted in accordance with the video signal, or the video signal and the audio signal transmitted from the broadcast transmitter 10.

The relay server 30 includes a transmitter and a collector to transmit the streaming data to the streaming apparatus 40.

The transmitter of such a relay server 30 transmits, to the collector, the streaming data corresponding to the multimedia stream transmitted from the PP server 20.

The collector included in the relay server 30 queues the streaming data corresponding to the multimedia stream transmitted from the transmitter before the streaming data is provided to the streaming apparatus 40.

The streaming apparatus 40 receives and stores the metafile including the reproduction list file, which is provided through the relay server 30.

The streaming apparatus 40 requests the relay server 30 for the fragment files according to the reproduction list file included in the metafile, and receives and stores the fragment files.

The streaming apparatus 40 may determine that the M3U8 format is applied by checking the first line of the metafile. The M3U8 format uses a '#EXT' string as a directive. In other words, the streaming apparatus 40 may recognize a directive of the metafile in the M3U8 format via the '#EXT' string. When a directive does not start with the '#EXT' string in the M3U8 format, all strings after # may be considered as annotation.

Also, the M3U8 format includes a directive indicating a maximum reproduction time of each file listed in a list file, i.e., a target length (#EXT-X_TARGETDURATION), a directive indicating a serial number of a file to be reproduced first (#EXT-X-MEDIA-SEQUENCE), and a directive indicating a reproduction time of a TS file after a respective directive (#EXTINF). When a live image is streamed, the list file in the M3U8 format may not end with "#EXT-X-ENDLIST".

The metafile (M3U8 file) including the reproduction list file that is information about videos to be reproduced, which is received from the relay server 30 by the streaming apparatus 40, may include names of image fragment files, i.e., TS files, wherein the names of the TS files may include non-negative integers that sequentially increase according to an execution order.

FIG. 2 illustrates a general metafile in a live streaming service using a protocol, FIGS. 3A and 3B illustrate a metafile in which a reproduction list file is modified, according to an example embodiment, and FIGS. 4A and 4B illustrate a metafile in which a reproduction list file is modified, according to another example embodiment.

Referring to FIG. 2, in the live streaming service using the HLS protocol, a general reproduction list file includes 3 or more fragment files (for example, 108516.ts to 108521.ts) as shown FIG. 2.

Unlike the general reproduction list file in the live streaming service using the HLS protocol, a reproduction list file in a streaming service, according to an example embodiment, may be modified to include lesser fragment files.

In some example embodiments, the streaming apparatus 40 may obtain a first fragment file name and a last fragment file name from fragment file names in the reproduction list file, and the streaming apparatus 40 may modify the reproduction list file based on the first fragment file name and the last fragment file name.

For example, the streaming apparatus 40 may check a serial number of the last fragment file name, assign, as a directive (#EXT-X-MEDIASEQUENCE) indicating a serial number of a file to be reproduced first, the serial number being obtained by subtracting N from the checked serial number, and generate a modified metafile including fragment file names after the assigned serial number.

Referring to FIGS. 3A and 3B, a serial number of a file to be reproduced first in a metafile received by the streaming apparatus 40 from the relay server 30 may be "108516", and the streaming apparatus 40 may modify the serial number by subtracting N (i.e., "1") from a serial number of a last fragment file name (i.e., 108521), to obtain an assigned serial number of 108520.

Then, the streaming apparatus 40 also modifies the metafile to include fragment file names including the modified serial number and a serial number after the modified serial number (in FIG. 3B, 108520 and 108521).

Here, a value of N may be adjusted according to a telecommunication policy or communication environment of each region or nation. For example, N may be 0 or 1. A telecommunication policy may be stored and managed after being downloaded from a policy server (not shown) of a corresponding nation when the streaming apparatus 40 is driven.

At this time, when the streaming apparatus 40 receives a metafile transmit request from the player 50 by operating as a server with respect to the player 50, the streaming apparatus 40 registers the received metafile transmit request.

Then, the streaming apparatus 40 transmits the modified metafile including the modified reproduction list file to the player 50.

After transmitting the modified metafile, the streaming apparatus 40 may transmit a fragment file according to a fragment file transmit request received from the player 50.

Here, the streaming apparatus 40 may monitor metafile information and continuously update the metafile information to maintain most recent metafile information.

In other words, the streaming apparatus 40 may periodically determine a change of an M3U8 list file, and receive and store TS files newly added according to the change by requesting the relay server 30 for the TS files.

As such, a M3U8 list file of a live streaming service may change according to time, and for example, may change when a new TS file is generated.

The streaming apparatus 40 may request for and reproduce a TS file added to a changed M3U8 list file. In order to determine a change of an M3U8 list file, the streaming apparatus 40 may request for the M3U8 list file within a period of time that is 0.5 to 1.5 times longer than a time assigned in a directive (#EXTINF) about a last fragment file included in the M3U8 list file.

As discussed in more detail below with reference to FIG. 8, the streaming apparatus 40 may include a file cache unit 124 that stores a fragment file corresponding to a modified metafile such that the fragment file is quickly provided according to a request of the player 50.

Here, a reproduction list file in a streaming service, according to an example embodiment, may include 3 to 6 fragment files so as to reduce buffering, and N that is subtracted by the streaming apparatus 40 may be a natural number in a range of 2 to 5, for example, may be 2.

Referring to FIGS. 4A and 4B, N that is subtracted by the streaming apparatus 40 may be 5, and accordingly, a serial number for starting reproduction is 108516 and the number of fragment files is 3. Thus, fragment files have serial numbers of 108516, 108517, and 108518.

As such, in a streaming service according to an example embodiment, the number of fragment files may be increased to reduce buffering. In FIGS. 4A and 4B, when an M3U8 list file is modulated such that reproduction forcibly starts from a first fragment file, 6 fragment files may be buffered, and thus buffering may be reduced.

Meanwhile, when the player 50 is driven, the player 50 may request the streaming apparatus 40 to transmit a metafile including a reproduction list file, and receive a corresponding metafile including a modified reproduction list file.

Here, the modified reproduction list file may have a format as shown in FIG. 3B or 4B, and includes a reproduction list including names of fragment files to be reproduced, i.e., fragment file names.

Upon receiving the metafile including the modified reproduction list file, such a player 50 checks a serial number of a file to be reproduced first, and reproduces the file to be reproduced first.

Accordingly, the player 50 requests the streaming apparatus 40 for a fragment file included in the reproduction list file to receive and reproduce the fragment file.

Here, the player 50 may also monitor and continuously update metafile information like the streaming apparatus 40 to maintain most recent metafile information.

In other words, the player 50 may periodically determine a change of an M3U8 list file, and receive and reproduce TS files newly added according to the change by requesting the streaming apparatus 40 for the TS files.

In order to determine a change of an M3U8 list file, the player 50 may request for the M3U8 list file within a period of time that is 0.5 to 1.5 times longer than a time assigned in a directive (#EXTINF) about a last fragment file included in the M3U8 list file.

The streaming apparatus 40 and the player 50 described above may be installed in one terminal apparatus.

The terminal apparatus may be a user apparatus that accesses a network and uses content provided through the network, wherein the terminal apparatus requests the relay server 30 for certain content, and receives and uses content transmitted from the relay server 30 according to the request.

Examples of the terminal apparatus may include all electronic/information communication devices having a communication function, such as a desktop personal computer (PC), a laptop computer, a tablet PC, a smart phone, a personal digital assistant (PDA), and an internet television (TV) (smart TV).

In particular, when the terminal apparatus is a smart phone, the streaming apparatus 40 and the player 50 may be driven by one application.

FIGS. 5A and 5B respectively illustrate a file reproduction order according to a general technology and a file reproduction order according to an example embodiment.

Referring to FIGS. 5A and 5B, file reproduction orders of the player 50 are shown in FIGS. 5A and 5B, wherein FIG. 5A illustrates a file reproduction order according to a general technology and FIG. 5B illustrates a file reproduction order according to an example embodiment.

In the file reproduction order in FIG. 5A, delay times may vary according to players as serial numbers of file names sequentially increase from 108516.ts during reproduction, whereas in the file reproduction order in FIG. 5B, delay times may be almost the same according to players as serial numbers of file names sequentially increase from 108520.ts during reproduction.

Figure 6A:
FIGS. 6A and 6B are diagrams for describing a delay time reduction according to an example embodiment.
Figure 6B:

FIGS. 6A and 6B are diagrams for describing a delay time reduction according to an example embodiment.

Referring to FIGS. 6A and 6B, results are shown in FIGS. 6A and 6B, wherein FIG. 6A illustrates a reproduction test result according to an example embodiment and FIG. 6B illustrates a reproduction test result in an MAC Safari browser.

As illustrated in FIG. 6A a time is 6:14:54 and in FIG. 6B a time is 6:14:36, and, therefore, a delay time of 18 seconds is reduced.

Figure 7A:
FIGS. 7A and 7B are diagrams for describing a delay time reduction according to another example embodiment.
Figure 7B:

FIGS. 7A and 7B are diagrams for describing a delay time reduction according to another example embodiment.

Referring to FIGS. 7A and 7B, other results are shown in FIGS. 7A and 7B, wherein FIG. 7A illustrates a reproduction test result according to an example embodiment and FIG. 7B illustrates a reproduction test result in an MAC Safari browser.

As illustrated in FIG. 7A a time is 6:22:00 and in FIG. 7B a time is 6:22:14, and, therefore, a delay time of 14 seconds is reduced.

As such, according to an example embodiment, reproduction start times may be prevented from becoming different per player according to the number of TS files included in an M3U8 list file.

Consequently, delay times may be substantially the same according to players.

Meanwhile, a network connecting the broadcast transmitter 10 and the PP server 20, and a network connecting the relay server 30 and the streaming apparatus 40 described above may each be a mobile communication network, such as code division multiple access (CDMA), wide band CDMA (WCDMA), high speed packet access (HSPA), or long-term evolution (LTE), a wired communication network, such as Ethernet, x-digital subscriber line (xDSL), hybrid fiber coax (HFC), or fiber to the home (FTTH), a wireless communication network, such as Wi-Fi, Wibro, Wimax, or ultra wideband (UMB), or a combination thereof, but are not limited thereto.

Figure 8:
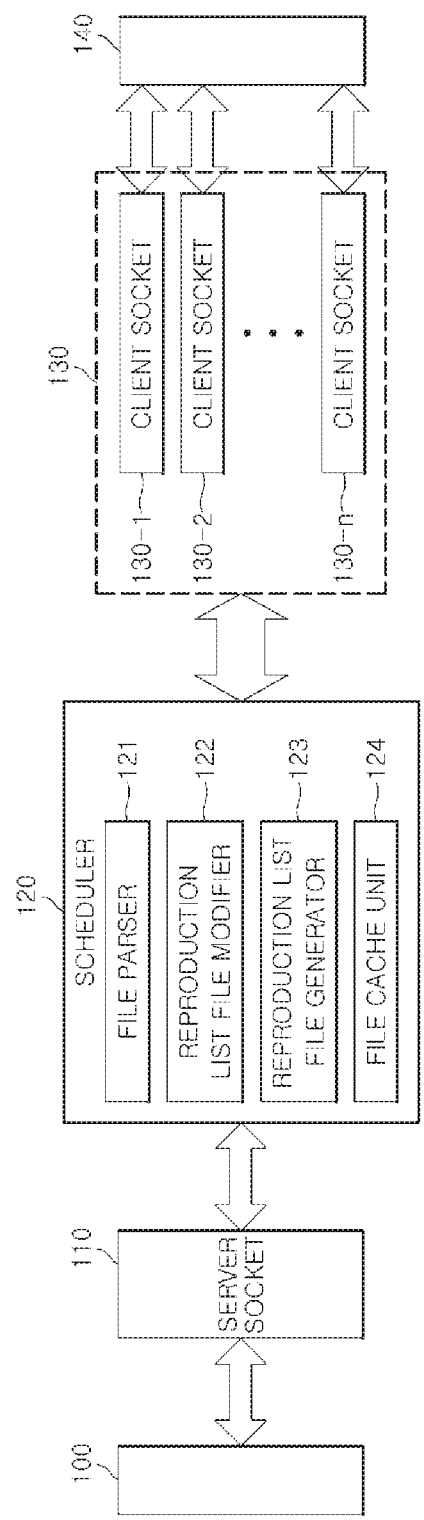
FIG. 8 is a block diagram of a streaming apparatus according to an example embodiment.

FIG. 8 is a block diagram of a streaming apparatus according to air example embodiment.

Referring to FIG. 8, the streaming apparatus 40 according to an example embodiment may include a server socket 110, a scheduler 120, and a client socket unit 130. The streaming apparatus 40 may be connected to a player 100. In some example embodiments, the player 100 may be the same element as the player 50 described above with regard to FIG. 1.

For example, as discussed above, the streaming apparatus 40 may include processing circuitry such as, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, etc.), and this processing circuitry may be configured through a layout design and/or computer readable instructions to perform the functions of the server socket 110, the scheduler 120, and/or the client socket unit 130 as well as the sub-components described as included in the same.

For example, when the processing circuitry includes a processor, a non-transitory computer readable medium may store computer readable instructions that, when executed, configure the processor as special purpose processor to perform the functions of the server socket 110, the scheduler 120, and/or the client socket unit 130 as well as the sub-components described as included in the same.

Further, when the streaming apparatus 40 is embodied within a terminal apparatus, such as a desktop personal computer (PC), a laptop computer, a tablet PC, a smart phone, a personal digital assistant (PDA), and an internet television (TV) (smart TV), the processing circuitry may be implemented by configuring the processing circuitry of the terminal apparatus to perform the functions of the server socket 110, the scheduler 120, and/or the client socket unit 130 as well as the sub-components described as included in the same.

Further, as discussed above, the streaming apparatus 40 and the player 50, 100 may both be embodied within the terminal apparatus such that the processing circuitry of the terminal apparatus is configured to perform the functions of both the streaming apparatus 40 and the player 100 and the sub-components described as included in the same.

The server socket 110 receives, from the player 100, a request to transmit a metafile including a reproduction list file, and transmits, to the scheduler 120, and registers the received request.

Then, the server socket 110 operates as a server with respect to the player 50 to transmit a metafile including a modified reproduction list file from the scheduler 120 to the player 100.

Then, upon receiving the request to transmit the metafile including the reproduction list file from the player 100 through the server socket 110, the scheduler 120 may store and manage the request. The scheduler 120 modifies a file name to be reproduced first from a reproduction list file included in a metafile received from a relay server 140, and then transmits the metafile including the modified reproduction list file to the player 100.

The scheduler 120 may include a file parser 121, a reproduction list file modifier 122, a reproduction list file generator 123, and a file cache unit 124.

The file parser 121 may extract a first fragment file name to be reproduced first and a last fragment file name to be reproduced last in the reproduction list file by parsing the metafile, and transmit the extracted first and last fragment file names to the reproduction list file modifier 122.

Then, the reproduction list file modifier 122 may check a serial number of the last fragment file name and assign, as a serial number of a file to be reproduced first, a serial number obtained by subtracting a certain number N from the checked serial number.

Accordingly, the reproduction list file generator 123 generates a modified metafile including a certain number of fragment file names having the assigned serial number of the file to be reproduced first and serial numbers sequentially increasing from the assigned serial number.

The certain number N to be subtracted by the reproduction list file modifier 122 may vary according to a telecommunication policy or the like of each nation, and thus is stored and managed after being received from a policy server of a corresponding nation, and may be 0 or 1.

Telecommunication policies of policy servers may be classified according to nations networks, 3G/LTE or WiFi), and are determined based on test and communication infrastructures in a corresponding region.

Here, the reproduction list file modifier 122 in a streaming service according to an example embodiment may modify the reproduction list file to include 3 to 6 fragment files to reduce buffering.

Also, the certain number N subtracted by the reproduction list file 122 may be a natural number in a range of 2 to 5, and may be 2.

Referring to FIGS. 4A and 4B, the certain number N subtracted by the reproduction list file modifier 122 may be 5, and accordingly, a serial number for starting reproduction is 108516 and the number of fragment files is 3. Thus, fragment files have serial numbers of 108516, 108517, and 108518.

As such, in a streaming service according to an example embodiment, the number of fragment files may be increased to reduce buffering. In FIGS. 4A and 4B, when an M3U8 list file is modulated such that reproduction forcibly starts from a first fragment file, 6 fragment files may be buffered, and thus buffering may be reduced.

Referring back to FIG. 8, the modified metafile generated as such by the reproduction list file generator 123 is provided to the player 100 through the server socket 110.

Meanwhile, the file cache unit 124 may store fragment files to be reproduced according to the modified metafile, and transmit the fragment files to the player 100 through the server socket 110 when the player 100 requests for the fragment files.

Meanwhile, the client socket unit 130 includes a plurality of client sockets 130-1 through **130-*n*, and operates as an HTTP client to receive a metafile from the relay server 140** and receive a fragment file included in the metafile.

The number of client sockets 130-1 through **130-*n* included in the client socket unit 130** may be suitably determined according to situations.

Such a client socket unit 130 processes request priorities, and manages a status (connecting, connected, recv header, or recv body (percent)) of an HTTP client.

The streaming apparatus 40 having such a structure may operate as follows.

The server socket 110 receives a request to transmit a metafile including a reproduction list file from the player 100, and registers the received request in the scheduler 120.

Then, upon receiving the request to transmit the metafile including the reproduction list file from the player 100 through the server socket 110, the scheduler 120 stores and manages the request, modifies a file name to be reproduced first in the reproduction list file included in the received metafile, and then transmits the metafile including the modified reproduction list file to the player 100.

Meanwhile, the file cache unit 124 stores fragment files to be reproduced according to the modified metafile, and transmits the fragment files to the player 100 when the player 100 requests for the fragment files through the server socket 110.

FIG. 9 is a flowchart of a streaming method according to an example embodiment.

A streaming apparatus according to an example embodiment may transmit an obtained reproduction list file to a player such that fragment files included in the reproduction list file are reproduced.

According to characteristics of a live streaming service, a reproduction list file is newly generated while a new fragment file is generated.

According to an example embodiment, when a live streaming service is provided, a first fragment file name and a list fragment file name in a reproduction list file received from a relay server are used to prevent delay times different according to players.

Also, the reproduction list file may be modified according to a fragment file newly generated by the relay server such that a player may receive and reproduce fragment files according to the modified reproduction list file.

Referring to FIG. 9, in operation S100 the streaming apparatus 40 may request the relay server for a metafile including a reproduction list file.

In operation S110, the streaming apparatus 40 may obtain the metallic including the reproduction list file from the relay server, and may obtain a first fragment file name and a last fragment file name from fragment file names in the reproduction list file.

In operation S120, the streaming apparatus 40 may modify the reproduction list file based on the first and last fragment file names.

For example, the streaming apparatus 40 may check a serial number of the last fragment file name and assign, as a directive (#EXT-MEDIASEQUENCE) indicating a serial number of a file to be reproduced first, a serial number obtained by subtracting a certain number N from the checked serial number, and then generate a modified metafile including fragment file names after the assigned serial number.

Here, the certain number N subtracted by the streaming apparatus 40 may be 0 or 1, and may be adjusted according to a telecommunication policy or communication environment of each region or nation.

The telecommunication policy may be stored and managed after being downloaded from a policy server (not shown) of a corresponding nation when the streaming apparatus 40 is driven.

The reproduction list file in a streaming service according to an example embodiment may include 3 to 6 fragment files so as to reduce buffering, and the certain number N subtracted by the streaming apparatus may be a natural number in a range of 2 to 5, for example, 2.

As such, in a streaming service according to an example embodiment, the number of fragment files may be increased to reduce buffering.

In operation S130, when a metafile transmit request is received from a player, the streaming apparatus 40 operates as a server with respect to the player to register the received metafile transmit request.

In operation S140, the streaming apparatus 40 transmits the metafile including the modified reproduction list file to the player.

In operations S150 and S160, the streaming apparatus 40 transmits fragment files to the player when the player requests for the fragment files according to transmission of the metafile.

According to example embodiments, reproduction start times may be prevented from becoming different per player according to the number of TS files included in an M3U8 list file.

Consequently, delay times may be materially the same according to players.

Also, according to example embodiments, since the streaming apparatus 40 transmits a modified metafile when the streaming apparatus 40 receives a metafile transmit request from the player 100 by operating as a server with respect to the player 100, a reproduction start time may be easily changed without having to change an upper server, and thus user convenience is increased.

In other words, according to example embodiments, since the player 100 communicates through the streaming apparatus 40 operating as a server with respect to the player 100, instead of directly through the relay server 140, delay time reduction and reproduction time differences are handled by the streaming apparatus 40, and thus realization and changes of the player 100 are facilitated, thereby increasing user convenience.

Also, according to example embodiments, since the number of TS files included in an M3U8 list file may be sufficiently obtained, buffering of a player may be reduced.

Example embodiments have been described above based on method operations showing certain functions and performances of relations of the certain functions. Functional components, and boundaries and orders of the method operations are arbitrarily defined herein for convenience of description.

Alternative boundaries and orders may be defined as long as the certain functions and the relations are suitably performed. Such alternative boundaries and orders thus are within the split and scope of the example embodiments. In addition, boundaries of the functional components are arbitrarily defined for convenience of description. Alternative boundaries may be defined as long as some important functions are suitably performed. Similarly, flowcharts may be arbitrarily defined herein to show some important functions. For expanded use, boundaries and orders of blocks in the flowcharts may be defined and still perform the important functions. Alternative definitions of the functional components, flowcharts, and orders are within the spirit and scope of example embodiments.

Example embodiments may have been at least partially described based on some example embodiments. Some example embodiments have been described to represent the example embodiments, the aspects, the features, the concepts, and/or the examples. Physical embodiments of apparatuses, products, machines, and/or processes realizing example embodiments may include one or more aspects, features, concepts, and examples described with reference to one or more example embodiments described herein. In addition, throughout drawings, the example embodiments may combine the same or similarly named functions, operations, and modules that may use the same or different reference numerals, and the functions, operations, and modules may be same, similar, or different functions, operations, and modules.

Although example embodiments have been described for illustrative purposes, those skilled in the art will appreciate that various modifications, additions and substitutions are possible, without departing from the scope and spirit of the example embodiments as disclosed in the accompanying claims.

Therefore, the example embodiments are disclosed only for illustrative purposes and should not be construed as limiting the example embodiments.

What is claimed is:

1. A streaming method performed by a streaming apparatus, the streaming method comprising:
generating a modified metafile by modifying a metafile that includes a reproduction list file, the modifying including subtracting N from a serial number of a last fragment file name of the reproduction list file to determine an assigned serial number of a file to reproduce first, N being a natural number, and generating the modified metafile such that the modified metafile includes a number of fragment file names having the assigned serial number and serial numbers sequentially increasing from the assigned serial number; and
transmitting the modified metafile, if the streaming apparatus receives a metafile transmit request from a player such that the streaming apparatus is configured to operate as a server with respect to the player.

2. The streaming method of claim 1, further comprising:
transmitting a fragment file, if the streaming apparatus receives a fragment file transmit request from the player after transmitting the modified metafile to the player.

3. The streaming method of claim 1, further comprising:
receiving the metafile from a relay server, wherein
the generating generates the modified metafile by modifying the metafile received from the relay server.

4. The streaming method of claim 3, wherein the receiving the metafile comprises:
requesting the metafile from the relay server via a plurality of client sockets operating as a hyper text transfer protocol (HTTP) clients; and
receiving the metafile from the relay server.

5. The streaming method of claim 1, wherein the generating the modified metafile comprises:
extracting the serial number of the last fragment file name from the metafile;
assigning the assigned serial number of the file to reproduce first by subtracting N from the serial number of the last fragment file name; and
generating the modified metafile including the number of fragment file names having the assigned serial number and serial numbers sequentially increasing from the assigned serial number.

6. The streaming method of claim 5,
wherein N is 0 or 1.

7. The streaming method of claim 5, wherein the assigning comprises:
determining the assigned serial number of the file to be reproduced first by subtracting N from the serial number of the last fragment file name, N being a natural number between 2 and 5; and
generating the modified metafile such that the modified metafile includes 3 to 6 fragment file names after the assigned serial number.

8. A streaming service system comprising:
a publish point server configured to segment multimedia data received in real-time into a plurality of fragment files, and to generate a metafile associated with the multimedia data;
a relay server configured to relay the metafile; and
a streaming apparatus including a memory and a processor, the memory containing computer readable code that, when executed by the processor, configures the processor to,
modify a reproduction list file included in the metafile by subtracting N from a serial number of a last fragment file name of the reproduction list file to determine an assigned serial number of a file to reproduce first, N being a natural number, and generating a modified metafile such that the modified metafile includes a number of fragment file names having the assigned serial number and serial numbers sequentially increasing from the assigned serial number, and
provide, to a player, the modified metafile such that the streaming apparatus is configured to operate as a server with respect to the player.

9. The streaming service system of claim 8, further comprising:
a terminal apparatus, the terminal apparatus including the streaming apparatus.

10. The streaming service system of claim 9, wherein the terminal apparatus is a smart phone, and
the player is configured to execute an application to configure the streaming apparatus included in the terminal apparatus.

11. A streaming apparatus comprising:
a memory and a processor, the memory containing computer readable code that, when executed by the processor, configures the processor to,
generate a modified metafile by modifying a reproduction list file included in a metafile, the modifying including subtracting N from a serial number of a last fragment file name of the reproduction list file to determine an assigned serial number of a file to reproduce first, N being a natural number, and generating the modified metafile such that the modified metafile includes a number of fragment file names having the assigned serial number and serial numbers sequentially increasing from the assigned serial number, and
transmit the modified metafile, if the streaming apparatus receives a metafile transmit request from a player such that the streaming apparatus is configured to operate as a server with respect to the player.

12. The streaming apparatus of claim 11, wherein the processor is configured to modify the reproduction list file by,
obtaining the serial number of the last fragment file name of the reproduction list file of the metafile,
generating the assigned serial number by subtracting N from the serial number of the last fragment file name, and
generating the modified metafile including a file name after the assigned serial number.

13. The streaming apparatus of claim 12, wherein N is 0 or 1.

14. The streaming apparatus of claim 11, wherein the processor is configured to,
extract the serial number of the last fragment file name from the metallic received from a relay server,
assign the assigned serial number of the file to reproduce first by subtracting N from the serial number of the last fragment file name, and
generate the modified metafile including a certain number of fragment file names having the assigned serial number and the serial numbers sequentially increasing from the assigned serial number.

15. The streaming apparatus of claim 14, wherein the processor is further configured to,
temporarily store a fragment file corresponding to a fragment file name of the metafile, and
transmit the temporarily stored fragment file according to the metafile transmit request of the player.

16. The streaming apparatus of claim 11, further comprising:
a client socket configured to receive the metafile from a relay server, and to transmit the metafile to the processor.

17. The streaming apparatus of claim 16, wherein the client socket operates as a hyper text transfer protocol (HTTP) client, the HTTP client including a plurality of client sockets configured to receive the metafile from the relay server.

18. The streaming apparatus of claim 11, wherein the processor is configured to modify the reproduction list file by,
determining the assigned serial number of the file to be reproduced first by subtracting N from the serial number of the last fragment file name of the reproduction list file, wherein N is a natural number between 2 and 5, and
generating the modified metafile such that the modified metafile includes 3 to 6 fragment file names after the assigned serial number.

19. A non-transitory computer-readable recording medium storing computer-executable instructions that, when executed by one or more processors included in a streaming apparatus, causes the one or more processors to perform operations including:
modifying a reproduction list file included in metafile received from a relay server to generate a modified reproduction list file, the reproduction list file including at least file names associated with fragmented multimedia data, the file names including an indication of an execution order of the fragmented multimedia data, the modifying including subtracting N from a serial number of a last fragment file name of the reproduction list file to determine an assigned serial number of a file to reproduce first, N being a natural number, and generating the modified reproduction list file such that the modified reproduction list file includes a number of fragment file names having the assigned serial number and serial numbers sequentially increasing from the assigned serial number;
storing, in a cache device, the fragmented multimedia data; and
streaming requested fragments of the fragmented multimedia data based on the modified reproduction list file.

20. The non-transitory computer-readable recording medium of claim 19, wherein the computer-executable instructions, when executed, cause the one or more processors to generate the modified reproduction list file by reducing a number of the files names in the reproduction list file such that a delay time associated with different terminal apparatuses streaming the modified reproduction list file is same.

* * * * *